United States Patent [19]
Westermann et al.

[11] 4,228,188
[45] Oct. 14, 1980

[54] METHOD OF MASHING AND LAUTERING

[75] Inventors: Donald H. Westermann, Brookfield; John E. Sawicki, Mequon; Nicolaas J. Huige, Glendale, all of Wis.

[73] Assignee: Jos. Schlitz Brewing Company, Milwaukee, Wis.

[21] Appl. No.: 883,907

[22] Filed: Mar. 6, 1978

[51] Int. Cl.² ............................................. C12C 11/00
[52] U.S. Cl. ........................................ 426/11; 426/16; 426/29
[58] Field of Search ................... 426/16, 11, 13, 29, 426/28

[56] References Cited
U.S. PATENT DOCUMENTS
1,243,440  10/1917  Nowak .................................. 426/11

*Primary Examiner*—Arthur D. Kellogg
*Attorney, Agent, or Firm*—Andrus, Sceales, Starke & Sawall

[57] ABSTRACT

An improved method of mashing and lautering. A mash is formed having a high malt to water ratio in the range of about 0.30 to 0.45 to 1. After mashing, and prior to lautering, the mash is diluted with water to produce an equivalent malt-to-water ratio below 0.25 to 1 and generally in the range of about 0.19 to 0.22 to 1. The diluted mash is then lautered by standard procedures to separate the wort from the spent grains. Due to the high concentration of malt in the mash, the conversion yield, or the amount of dissolved solids extracted from the malt, is increased and the dilution prior to lautering not only reduces the time for lautering but also upsets the concentration equilibrium between the liquids and grains, causing a further improvement in the extract yield.

4 Claims, No Drawings

METHOD OF MASHING AND LAUTERING

BACKGROUND OF THE INVENTION

In the mashing process in brewing, malt is converted by mixing the malt with water and heating the mash to elevated temperatures to solubilize and saccharify the starches. In traditional brewing practice, a malt-to-water weight ratio of about 0.30 to 1 is used in the mash, and the malt is added to the water at a temperature in the range of 100° F. and 146° F. and held at this temperature for a period of about 20 to 40 minutes. This serves to wet down the malt and liquify the starch. The mash is then heated to a conversion temperature and held at this temperature for a period of up to 60 minutes. The conversion temperature provides the proper environment for optimum enzyme activity for conversion of the liquified starch.

After completion of conversion or saccharification, the mash is raised to a "mash-off" temperature and is held at this temperature for a short period to terminate the enzyme activity.

In the conventional brewing practice, the mash is then pumped to the lauter tub where the spent grains are separated from the liquid portion of the mash to provide a wort which is subsequently delivered to the brew kettle. In the lauter tub the grains settle to the bottom of the tub to form a bed which acts as a filtering medium. In the typical lautering procedure, the wort initially discharged from the lauter tub is recycled back to the lauter tub and the recycling is continued until a clear wort is obtained, which is then sent to the brew kettle.

After the wort has been withdrawn to a level just covering the grain bed, sparge water is sprayed into the bed to maintain a constant head in the lauter tub and a constant run-off to the brew kettle. The sparging is continued until a desired liquid level is attained in the brew kettle.

SUMMARY OF THE INVENTION

The invention is directed to an improved method of mashing and lautering which produces a higher conversion yield of dissolved solids, as well as improved lautering efficiency. In accordance with the invention, a mash is formed having a high malt-to-water ratio generally in the range of 0.35 to 0.45 to 1 as compared with a conventional malt-to-water ratio of about 0.30 to 1. The mashing is carried out under conventional procedures, and after mashing, the mash is diluted with water prior to lautering. The amount of water added in the dilution is such that the equivalent malt-to-water ratio is less than 0.25 and generally in the range of 0.19 to 0.22 to 1.

The diluted mash is then lautered in a conventional manner, although the amount of sparge water utilized to achieve the desired liquid level in the brew kettle is reduced because of the dilution prior to lautering.

Due to the high concentration of malt in the mash, the conversion yield is increased so that the liquid portion of the mash has an increased amount of dissolved solids as compared with a conventional mash using the same amount of malt. The dilution prior to lautering not only reduces the time necessary for the lautering operation but also improves the lautering efficiency and upsets the concentration equilibrium between the liquid and grains, causing additional quantities of dissolved solids to diffuse from the solid to the liquid phase. Thus, the yield is increased both in the mashing and lautering steps so that the process produces a significantly higher Plato wort. At the desired Plato for fermentation, a greater volume of beer can therefore be produced from a given quantity of malt.

Other objects and advantages will appear in the course of the following description.

DESCRIPTION OF THE PREFERRED EMBODIMENT

In accordance with the invention, a mash is prepared having a high malt-to-water weight ratio above 0.30 and generally in the range of 0.35 to 0.45 to 1. The mashing is carried out under conventional techniques in which the malt is mixed with the water which is at a temperature of about 100° F. to 140° F., and held at this temperature for a period of about 20 to 40 minutes to wet down the malt and liquify the starch. After this mashing period, the temperature of the mash is raised to a conversion temperature in the range of about 150° F. to 160° F., during which the enzyme activity is at an optimum level and the liquified starch is converted to sugar. After the conversion, the temperature of the mash is again raised to a mash-off temperature of about 170° F. to 175° F., and the mash is held at this temperature for a short period of time to terminate the enzyme activity.

During the entire mashing procedure, the mash is agitated, preferably by mechanical agitators, to achieve optimum heat transfer between the materials.

It has been found quite unexpectedly that the highly concentrated mash, as used in the invention, yields significantly higher amounts of dissolved solids than more diluted mashes for equal weights of malt. The increased conversion yield is a function of mash concentration and energy input to the mash through agitation.

Prior to introducing the mash into the lauter tub, the mash is diluted with water. The dilution can be made to the mash tub just prior to pumping over to the lauter tub, or alternately the dilution can be made as the mash is pumped over to the lauter tub. The amount of water added to the mash is not critical, but it is preferred to dilute with sufficient water to reduce the equivalent malt-water ratio to a value below 0.25 and preferably to a value in the range of 0.19 to 0.22 to 1.

The lauter tub as used in the process of the invention is a conventional type, and when the diluted mash is pumped over to the lauter tub, the spent grains will settle to the bottom of the tub in the form of a bed. As in the conventional practice, the wort draining through the bed is initially recycled back into the tub until a clear wort is obtained, and then the wort is transferred to the brew kettle.

As the diluted mash has an increased water content over conventional mashes, less sparge water is used in the lautering operation. In the conventional brewing practice, sparge water is added to the lauter tub and run off to the brew kettle until the brew kettle contains a predetermined volume of wort. With the process of the invention, the diluted mash has a higher water content, so that less sparging water is required to achieve the desired volume in the brew kettle.

The dilution prior to lautering has distinct advantages in that the grain bed sets up more quickly due to the lower specific gravity of the liquid. Earlier setting up of the bed will reduce the overall lautering time.

By virtue of the dilution, an increased diffusional driving force is achieved which upsets the concentration equilbrium between the liquid and grains, causing additional dissolved material to be diffused from the solid to the liquid phase. This increase in diffusion rate further improves the extract yield of the process.

The dilution prior to lautering also improves the lautering efficiency. It has been found that a less viscous liquid has a greater capability for washing sugars from the grains than a more viscous liquid. Thus, the dilution increases the efficiency of the lautering operation.

The dilution also eliminates the necessity for restructuring or loosening the bed in the lauter tub. With concentrated mashes, the brews are more difficult to lauter, frequently requiring loosening, which is accomplished by introducing water under the bed to jostle and condition the bed. With the diluted mash, there is no tendency for the bed to plug up so that loosening of the bed is not required.

The following examples illustrate the mashing process of the invention.

A series of pilot mashes were prepared including (i) conventional mash having a malt-water ratio of 0.298 to 1. (ii) a diluted mash havng a malt-water ratio of 0.208, and (iii) a concentrated mash, in accordance with the invention, having a malt-to-water ratio of 0.422.

Each of the mashes was prepared by initially milling fresh brewhouse malt in a Miag roller mill with a 0.041 inch gap set. The milled malt was then added to water which was at a temperature of 120° F.

In each case the mash was maintained at the mashing temperature for a period of 36 minutes, then heated to a conversion temperature of 155° F. and held at this temperature for 30 minutes and subsequently heated to a mash off temperature of 172° F. and held at this temperature for 5 minutes. The mashes were then cooled and the conversion yield were calculated. The conversion yield is the weight of dissolved solids in the mash liquid per dry weight of malt used.

Table I shows the conversion yield for the three mashes. This data indicates that the conversion yield is a linear function of the concentration at a given energy input, and the concentrated mash of the invention with a malt-to-water ratio of 0.422 had a significantly higher conversion yield of 81.35% than the normal mash and the diluted mash.

TABLE I

| Mash | Malt to Water Weight Ratio | Conversion Yield (%) |
| --- | --- | --- |
| Dilute | 0.208 | 79.46 |
| Normal | 0.298 | 80.51 |
| Concentrated | 0.422 | 81.35 |

These tests illustrate that the concentrated mash, as used in the invention, achieves a higher conversion yield than conventional malt-water ratios. This result is unexpected in that one would normally expect that, regardless of the malt-to-water ratio, the same conversion yield would result, with any residual solids being non-convertible.

The following examples illustrate the increased lautering efficiency that is obtained in lautering a diluted mash:

A series of mashes were prepared, as shown in Table II below, using identical quantities of fresh brewhouse malt. A control mash was prepared with malt-to-water weight ratio of 0.283 to 1, while a concentrated mash was prepared having a malt-to-water ratio of 0.400 to 1, and a dilute mash was prepared having a malt-to-water ratio of 0.198 to 1. The conditions used in mashing were the same as that outlined in the previous example.

After mashing the three mashes were lautered in the identical manner except for the amount of sparge water. The amount of sparge water added in each case was sufficient to provide the same total water content for all three extracts.

The term "extract efficiency" as used in Table II is the extract yield (weight of dissolved solids delivered to brew kettle per weight of malt used) divided by the conversion yield (weight of dissolved solids in the mash liquid per dry weight of malt used). The extraction efficiency is a reflection of the efficiency with which the solubles converted in the mash are extacted in the lauter tub.

As shown in Table II, the dilute mash had an extraction efficiency of 95.94% as compared with a value of 86.17% for the concentrated mash. Thus, the diluted mash, having a malt-to-water ratio of 0.198 to 1, showed a significant increase in lautering efficiency over a concentrated mash.

The data in Table II also shows that the run-off time for lautering was reduced by using the diluted mash. The diluted mash averaged 62.5 minutes for run-off as compared with 65.5 minutes for the normal or control mash and 75.0 minutes for a concentrated mash. Furthermore, the concentrated mash had to be restructured an average of 2.5 times during run-off to condition the grain bed, while the diluted and control mashes did not require conditioning. The decrease in run-off time is an important factor in the brewing process, enabling the total number of brews per 24 hour day per month to be significantly increased.

TABLE II

| Mash | Malt to Water Weight Ratio | Extraction Efficiency (%) | Lauter Tub Run-Off Time (Mins.) |
| --- | --- | --- | --- |
| Concentrated | 0.400 | 86.17 | 75.0 |
| Normal (Control) | 0.283 | — | 65.6 |
| Dilute | 0.198 | 95.94 | 62.5 |

Through the process of the invention the conversion is increased in both the mashing operation and in the lautering. By virtue of the high concentration of malt in the mash, the conversion yield is increased over conventional mashing procedures and a second stage of increased yield is obtained by diluting the concentrated mash prior to lautering. The dilution upsets the concentration equilibrium between the liquid and the solid phase, causing additional quantities of dissolved solids to diffuse from the solid phase to the liquid during lautering.

The dilution prior to lautering has the additional advantage of reducing the run-off time from the lauter tub, and the diluted liquid has a greater capability for washing the sugars from the surfaces of the spent grain to increase the effectiveness of the lautering operation.

Various modes of carrying out the invention are contemplated as being within the scope of the following claims particularly pointing out and distinctly claiming the subject matter which is regarded as the invention.

We claim:

1. A method of mashing and lautering, comprising the steps of preparing a mash of malt and water with the malt-to-water weight ratio being in the range of 0.35 to 0.45 to 1, heating the mash to a temperature sufficiently high to liquify the starches in the malt and convert the starches to fermentable sugars, diluting the mash after conversion with sufficient water to provide an equivalent malt-to-water ratio of less than 0.25 to 1, and thereafter lautering the diluted mash in a lautering vessel to separate the spent grains from the liquid phase.

2. The method of claim 1, and including the step of agitating the mash during heating.

3. The method of claim 2, and including the steps of delivering the liquid phase to a brew kettle, sparging the spent grains with water in the lautering vessel and delivering the sparge water to the brew kettle, and continuing the sparging until the liquid volume in the brew kettle reaches a predetermined value.

4. The method of claim 2, wherein the mash is diluted with sufficient water to produce an equivalent malt-to-water weight ratio of 0.19 to 0.22 to 1.

* * * * *